Dec. 12, 1961 R. E. PHELPS ET AL 3,012,675
DEVICE FOR SEPARATING WATER AND OTHER FOREIGN MATTER FROM OIL
Filed March 30, 1959 2 Sheets-Sheet 1
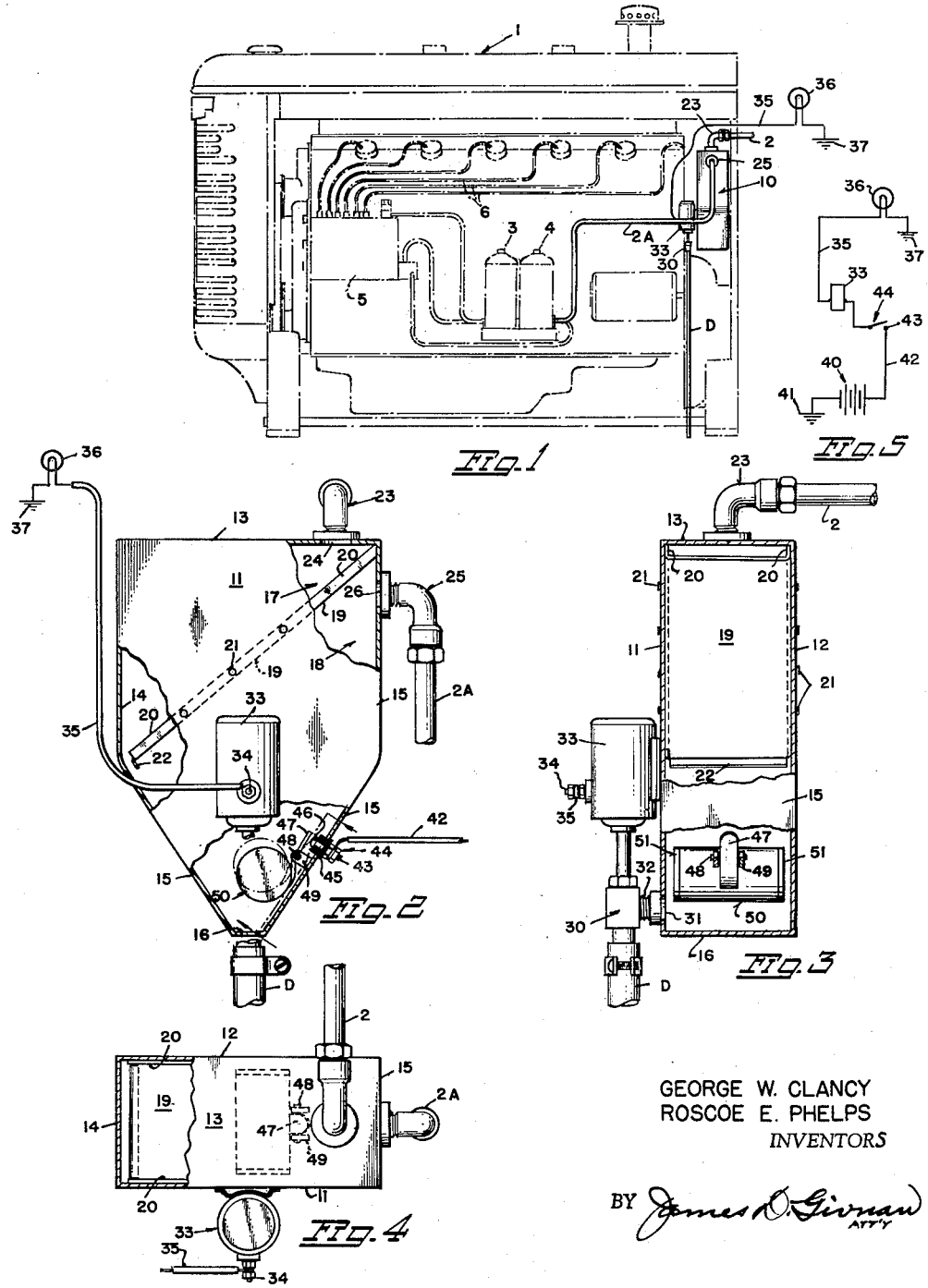
GEORGE W. CLANCY
ROSCOE E. PHELPS
INVENTORS Dec. 12, 1961 R. E. PHELPS ET AL 3,012,675
DEVICE FOR SEPARATING WATER AND OTHER FOREIGN MATTER FROM OIL
Filed March 30, 1959 2 Sheets-Sheet 2
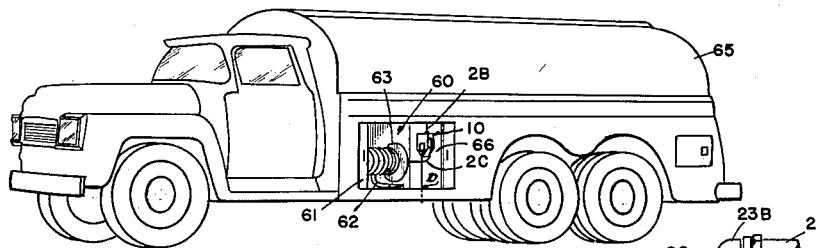
*Fig. 6*
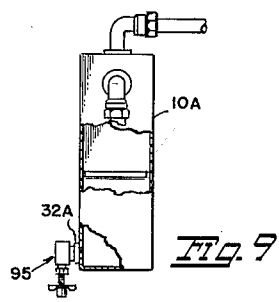
*Fig. 9*
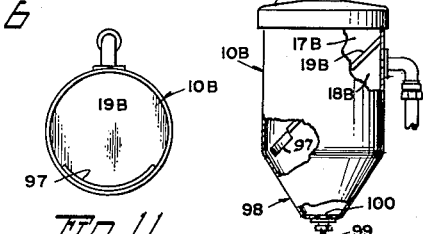
*Fig. 11* *Fig. 10*
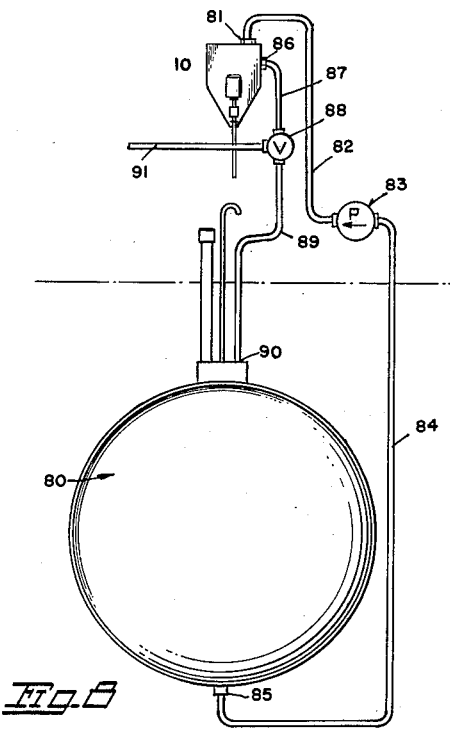
*Fig. 8*
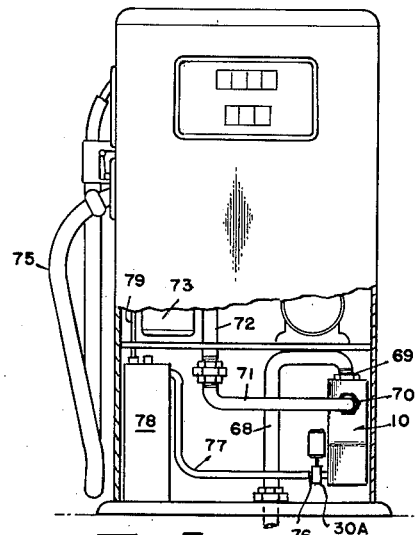
*Fig. 7*
GEORGE W. CLANCY
ROSCOE E. PHELPS
INVENTOR.
BY James O. Girman
ATT'Y

United States Patent Office 3,012,675
Patented Dec. 12, 1961

3,012,675
DEVICE FOR SEPARATING WATER AND OTHER FOREIGN MATTER FROM OIL
Roscoe E. Phelps, Rte. 1, Box 305, and George W. Clancy, Rte. 1, both of Otis, Oreg.
Filed Mar. 30, 1959, Ser. No. 802,983
2 Claims. (Cl. 210—86)

This invention relates generally to fuel oil storage, transportation, pumping and distribution systems and, more particularly, to a new and novel means adapted to be connected into the fuel lines of automotive engines, storage tanks, tank trucks, marine tankers, fuel pumps at service stations, and similar points of distribution for automatically separating water condensate and other foreign substances from the oil in the system.

In automotive fuel systems now common in the art, various types of water traps are utilized which require periodic attention and drainage by an operator to rid the system of water condensate usually before the start of a day's operation. Water in a diesel engine fuel system, for example, will cause burning of the tips of the injection nozzles and pitting of the piston heads and combustion chambers.

Accordingly, it is one of the principal objects of the present invention to provide a water and oil separator of the character described which is of simple, efficient, durable and inexpensive construction readily adaptable for installation in any fuel handling system or engine fuel oil system and which is entirely automatic in operation and requires no attention on the part of an attendant or engine operator.

The foregoing and other objects and advantages which will become subsequently apparent reside in the details of construction and operation as more fully hereinafter described and claimed, reference being had to the accompanying drawings forming a part hereof and in which:

FIGURE 1 is a side elevational view in broken lines of a diesel engine equipped with a water and oil separator made in accordance with our invention.

FIGURE 2 is a front elevational view on an enlarged scale of the invention with fragments of its front wall broken away to reveal internal parts.

FIGURES 3 and 4 are respectively side and top plan views of FIGURE 2 with fragments broken away to more clearly illustrate the internal parts of FIGURE 2.

FIGURE 5 is a wiring diagram.

FIGURE 6 is a perspective view of a tank truck showing our invention in operative communication with a dispensing hose wound about a reel carried by the truck.

FIGURE 7 is a front elevational view of a gasoline pump housing with a fragment of its front wall broken away and showing our invention operatively applied to the fuel lines within the pump housing and also connected to a water collector tank within the housing.

FIGURE 8 is an end view of an underground fuel storage tank showing our invention connected into the fuel dispensing system thereof.

FIGURE 9 is a view similar to FIGURE 3 illustrating a modification of the invention.

FIGURE 10 is a fragmentary side elevational view of a further modification of the invention.

FIGURE 11 is a top plan view of FIGURE 10 with the cover plate thereof removed.

With continuing reference to the drawings wherein like numerals of reference designate like parts and particularly FIGURES 1 to 5 thereof, reference numeral 1 indicates generally a diesel engine provided with a fuel line 2 for supplying fuel oil to filters 3 and 4 from a fuel tank, not shown. Oil from the filters passes through the distributor block 5 under pressure and through tubes 6 to the injection nozzles 7, all in the conventional manner.

The main body of our invention is a tank of box-like formation indicated generally at 10 having a flat front wall 11, flat rear wall 12, top wall 13 and side walls 14 and 15. The lower portions of the front and rear walls taper uniformly to a relatively narrow bottom wall 16, and the lower portions of the side walls 14 and 15 are bent inwardly in conformity with the taper of the front and rear walls, and thus provide a water trap within the tank as will be more fully hereinafter pointed out.

The tank is divided into an intake chamber 17 and an outlet chamber 18 by a flat downwardly inclined plate 19 flanged along both of its sides as at 20 and thereby secured to the front and rear walls of the tank by means of rivets or the like as at 21. The top end of the plate and flanges are in fluid tight abutment respectively against the side wall 15 and top wall 13. The bottom end of the plate is bent downwardly as at 22 adjacent the bend line of the side wall 14 to provide a spillway spaced slightly inwardly from the side wall 14.

The fuel line 2 from the fuel tank, not shown, is in open communication with the intake chamber 17 by means of a fitting 23 and an opening 24 in the top wall 13 adjacent the top end of the plate 19.

The fuel line 2A from the tank 10 to the filters 3 and 4 or to other points of distribution when used in other fuel systems is in open communication with the outlet chamber 18 by means of a fitting 25 and an opening 26 in the side wall 15 just below the top end of the plate 19.

From the foregoing, it will be apparent that oil, and any water or other foreign matter commingled therewith, entering the inlet chamber 17 will spread out over the flat plate 19 and gravitate, with the water ahead of the oil, through the spillway opening at the bottom end of the plate 19 and into the outlet chamber 18 wherein the water or matter of heavier density than the oil will settle to the bottom of the chamber 18 and pure oil will be drawn through the fuel line 2A, connected through the filters 3 and 4 to a fuel pump, not shown, within the distributor block 5. Because of the width, length and angle of inclination of the plate 19 and that of the lower portion of the side wall 14 and the fact that oil is more viscous than water separation of the water from the oil will quickly take place.

The bottom of the outlet chamber 18 is in communication with a solenoid valve 30 by means of a drainage opening 31 and fittings 32. The valve 30 is operated by the solenoid coil 33 whose one side is grounded to the tank 10 and whose opposite side is provided with a binding post 34 in circuit by wire 35 with one side of an indicator lamp 36 whose opposite side is grounded as at 37 (see also FIGURE 5). A source of electrical energy, for example, battery 40 is grounded as at 41 at one of its sides, and its opposite side is connected by conductor 42 to one end of a binding post 43 as a component of a float switch indicated generally at 44. The binding post is secured to and insulated from the wall 15 of the tank as at 45, and the opposite end of the binding post provides a fixed contact 46 within the tank for cooperation with the free end of a switch arm 47 pivotally mounted as at 48 to a bracket 49 secured to the interior of the wall 15 of the tank. A float indicated generally at 50 is secured to the opposite end of the arm 47. The float may be of hollow cylindrical form sealed at both of its ends by closure discs 51, or the float may be made of any other light-weight buoyant material and provided with the discs 51 whose thickness and weight are calculated to render the float buoyant in water and non-buoyant in oil. It will be noted in FIGURES 2 and 3 that the float 50 is disposed in an elevated position relative to the bottom wall 16 of the tank 10, so that the float will be actuated only when a sufficient quantity of water accumulates within the bottom of the tank to give buoyancy to the float against the downward load of oil above it, and also to prevent any loss of oil which would occur if the float were so close to the bottom wall 16 of the tank that it would float in water not deep enough to prevent escapement of the oil through the outlet 31. Since oil is lighter than water, any water accumulating within the trap or bottom end of the tank 10 will cause the float to rise as indicated in broken lines in FIGURE 2 to thereby close the circuit from the battery through conductor 42, float switch 44, solenoid coil 33, conductor 35 through the lamp 36 to the ground connections 37 and 41 to the other side of the battery.

The resultant energization of the solenoid coil will open the valve 30 to allow the trapped water within the bottom end of the tank 10 to drain out through the opening 31 and a drainage hose D in open communication with the valve 30.

The tank truck shown in FIGURE 6 is provided with the conventional outwardly opening compartment 60 having sliding doors 61 and provided on its interior with a dispensing hose 62 coiled about a hose reel 63. Gasoline or fuel oil from the tank 65 of the truck is pumped through the hose for delivery to points remote from the truck. The water and oil separator of our invention indicated at 10 may be secured to a side wall 66 of the compartment 60 and connected by the tube 2B with a gravity feed connection with the tank 65 and the pipe 2C connected to the dispensing hose 62 through a suction pump, not shown, and the drainage hose D may extend downwardly through the bottom wall of the compartment as shown.

Our invention, when applied to a gasoline pump of the type used in service stations and the like, as shown in FIGURE 7, may be supported by the discharge end of a relatively heavy pipe 68 from an underground storage tank, not shown. This end of the pipe 68 is in open communication with the interior of the intake chamber 17 of the tank 10 by a threaded connection 69, and the outlet chamber 18 is by a similar connection 70 in open communication with a pipe 71, pipe 72 and a suction pump 73 from which gasoline or fuel oil is supplied to the conventional dispensing hose 75. The solenoid valve 30A in this installation is modified to provide an outlet or discharge opening in its side as at 76 instead of out of the bottom as in FIGURES 2, 3, 6 and 8 so that said opening can be connected by a tube 77 to the interior of a water collector tank 78 similarly connected by a tube 79 to a source of suction not shown.

When the invention is applied to the piping system of an underground storage tank 80 as shown in FIGURE 8, the tank 10 may be supported by a threaded connection 81 to a standpipe 82 connected to one side of a pump 83 whose opposite side is connected through a pipe 84 to the bottom interior of the storage tank 80 as at 85. The tank 10 is also supported by a second threaded connection 86 to a second standpipe 87 which, through a valve 88 and a third standpipe 89, is in communication with the top interior of the tank 80 through a fitting 90. The valve 88 is connected with one end of a dispensing pipe 91 whose opposite end terminates at any desired point of discharge or in connection with a dispensing fixture, not shown.

In the modification of the invention shown in FIGURE 9, we dispense with the solenoid valve 30 and instead provide the outlet fitting 32A with a manually operable valve indicated generally at 95, of the type commonly used in automotive raidators for drainage purposes.

In the further modification shown in FIGURES 10 and 11 the tank 10B is of cylindrical form and provided with a top closure 96 provided with a fitting 23B by means of which fuel from the line 2B is admitted to the intake chamber 17B which is separated from the outlet chamber 18B by the inclined plate 19B of ovoidal shape and recessed about its bottom edge to provide a downwardly flanged spillway 97. The apex of the inverted frustoconical bottom portion 98 of the tank is provide with a valve 99 of the type described in connection with FIGURE 9 for controlling the drainage of accumulated water out through a drainage opening 100 in the bottom of the tank.

While we have shown particular forms of embodiment of our invention we are aware that many minor changes therein will readily suggest themselves to others skilled in the art without departing from the spirit and scope of the invention. Having thus described our invention what we claim as new and desire to protect by Letters patent is:

1. A device for separating water from oil, said device comprising a vertically disposed tank having a top wall, flat front and rear walls having lower portions uniformly tapering to a relatively narrow bottom wall, side walls having lower portions bent inwardly in conformity with the taper of said front and rear walls, said tank divided into an inlet chamber and an outlet chamber by a single downwardly inclined flat partition in fluid-tight abutment at its top end with said top, front, rear and one of said side walls and in similar abutment substantially throughout its length with said front and rear walls, the bottom end of said partition terminating in slightly spaced apart relation to the other of said side walls at the bend line therein to thereby provide a flat uninterrupted spillway from the inlet chamber to the outlet chamber and extending from the front wall to the rear wall, an inlet line in open communication at one of its ends with the interior of said inlet chamber adjacent the top end of said partition to direct incoming commingled oil and water directly upon said partition at the top end thereof whereby the oil and water will spread out upon and flow from the partition through said spillway onto said inwardly bent portion of the other of said side walls, whereby the viscosity of the oil compared to the lesser resistance to flow of water separation of the oil from the water will quickly take place during fluid flow downwardly along the partition and downwardly along said inwardly bent portion of said other of said side walls, a suction line in open communication at one of its ends with said outlet chamber adjacent the top end of said partition, and said outlet chamber having a drainage outlet therein.

2. A device for separating water from oil as claimed in claim 1, wherein said front wall has said drainage outlet therein above said bottom wall whereby to provide a trap for water separated from the oil, a normally closed solenoid valve in said drainage outlet, a float hingedly attached to the interior of the inwardly bent portion of said one of said side walls and buoyantly responsive to the water at a predetermined level within the trap, a switch arm carried by said float, an electrical contact extending through and insulated from the inwardly bent portion of the last mentioned side wall and disposed in the path of movement of said switch arm, a signal lamp remotely disposed from said tank and in circuit through said solenoid valve, switch arm and contact, with a source of electrical energy, whereby flotation of the float within the water trap will cause energization of the solenoid valve, drainage of water from the water trap and illumination of the signal lamp to indicate the occurrence of water drainage.

References Cited in the file of this patent
UNITED STATES PATENTS

| | | |
|---|---|---|
| 1,363,589 | Hartman | Dec. 28, 1920 |
| 1,992,133 | Tarte | Feb. 19, 1935 |
| 2,270,616 | Bell | Jan. 20, 1942 |
| 2,422,555 | Karlston et al. | June 17, 1947 |
| 2,656,926 | Garaycochea | Oct. 27, 1953 |
| 2,826,306 | Burns | Mar. 11, 1958 |
| 2,844,254 | Ansley | July 22, 1958 |

FOREIGN PATENTS

| | | |
|---|---|---|
| 704,804 | France | Feb. 24, 1931 |